(12) United States Patent
Cho et al.

(10) Patent No.: US 11,763,963 B2
(45) Date of Patent: Sep. 19, 2023

(54) POWER CABLE

(71) Applicant: LS CABLE & SYSTEM LTD., Anyang-si (KR)

(72) Inventors: Young Eun Cho, Seoul (KR); Gi Joon Nam, Seoul (KR); Min Sang Cho, Seoul (KR); Sue Jin Son, Anyang-Si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 438 days.

(21) Appl. No.: 16/963,085

(22) PCT Filed: Jan. 24, 2019

(86) PCT No.: PCT/KR2019/000994
§ 371 (c)(1),
(2) Date: Jul. 17, 2020

(87) PCT Pub. No.: WO2019/147027
PCT Pub. Date: Aug. 1, 2019

(65) Prior Publication Data
US 2020/0350095 A1    Nov. 5, 2020

(30) Foreign Application Priority Data

Jan. 25, 2018 (KR) .......................... 10-2018-0009230

(51) Int. Cl.
*H01B 7/04* (2006.01)
*H01B 3/44* (2006.01)

(52) U.S. Cl.
CPC ............... *H01B 7/04* (2013.01); *H01B 3/441* (2013.01)

(58) Field of Classification Search
None
See application file for complete search history.

(56) References Cited

U.S. PATENT DOCUMENTS

2008/0262136 A1* 10/2008 Akermark .............. H01B 3/446
524/323
2010/0022715 A1*  1/2010 Grein ...................... C08L 23/04
525/240

(Continued)

FOREIGN PATENT DOCUMENTS

| CN | 102686663 A | 9/2012 |
|---|---|---|
| CN | 103764696 A | 4/2014 |

(Continued)

OTHER PUBLICATIONS

Chinese Office Action for related Chinese Application No. 201980009750.6; action dated Apr. 21, 2021; (6 pages).

(Continued)

*Primary Examiner* — Krystal Robinson
(74) *Attorney, Agent, or Firm* — K&L Gates LLP

(57) ABSTRACT

Provided is a power cable, and particularly, to an ultra-high-voltage power cable of 45 kV to 600 kV. Specifically, the present invention relates to a power cable which is eco-friendly and includes an insulating layer formed of an insulating material having not only high heat resistance and mechanical strength but also high flexibility, bendability, impact resistance, cold resistance, installability, workability, etc., which are in trade-off with heat resistance and mechanical strength, and of which the lifespan, flexibility and installability can be additionally improved through precise control of a thickness of the insulating layer according to characteristics of the insulating material, thereby enhancing workability.

8 Claims, 1 Drawing Sheet

(56) References Cited

U.S. PATENT DOCUMENTS

2010/0193217 A1* 8/2010 Laurenson ............... C08K 5/14
                                              174/120 SR
2017/0240733 A1   8/2017 Gitsas et al.

FOREIGN PATENT DOCUMENTS

| CN | 105612209 A   | 5/2016  |
|----|---------------|---------|
| CN | 105745271 A   | 7/2016  |
| CN | 106604962 A   | 4/2017  |
| EP | 3270387 A1    | 1/2018  |
| EP | 3780016 A1    | 2/2021  |
| EP | 3819918 A1    | 5/2021  |
| JP | 2016531970 A  | 10/2016 |
| KR | 1020140053369 | 5/2014  |
| KR | 20140102407 A | 8/2014  |
| KR | 20140134836 A | 11/2014 |
| KR | 20180001993 A | 1/2018  |
| WO | 2012085612 A1 | 6/2021  |

OTHER PUBLICATIONS

European Search Report for related European Application No. 19744267.6; action dated Oct. 4, 2021; (6 pages).
International Search Report for related International Application No. PCT/KR2019/000994; report dated Aug. 1, 2019; (5 pages).
Written Opinion for related International Application No. PCT/KR2019/000994; report dated Aug. 1, 2019; (4 pages).

* cited by examiner

POWER CABLE

CROSS-REFERENCE TO RELATED APPLICATIONS

The present application is a National Stage of International Application No. PCT/KR2019/000994, filed Jan. 24, 2019, which claims priority to Korean Application No. 10-2018-0009230, filed Jan. 25, 2018, the disclosure of which are incorporated herein by reference.

FIELD OF THE INVENTION

The present invention relates to a power cable, and particularly, to an ultra-high-voltage power cable of 45 kV to 600 kV. Specifically, the present invention relates to a power cable which is eco-friendly and includes an insulating layer formed of an insulating material having not only high heat resistance and mechanical strength but also high flexibility, bendability, impact resistance, cold resistance, installability, workability, etc., which are in trade-off with heat resistance and mechanical strength, and of which the lifespan, flexibility and installability can be additionally improved through precise control of a thickness of the insulating layer according to characteristics of the insulating material, thereby enhancing workability.

BACKGROUND OF THE INVENTION

In general, a power cable includes a conductor and an insulating layer covering the conductor. Particularly, a high-voltage or ultra-high-voltage power cable may further include an inner semiconducting layer between the conductor and the insulating layer, an outer semiconducting layer covering the insulating layer, a sheath layer covering the outer semiconducting layer, and the like.

In recent years, as the demand for electrical power has increased, the development of high-capacity cables has been required. To this end, an insulating material for forming an insulating layer having excellent mechanical and electrical properties is needed.

Generally, a crosslinked polyolefin polymer such as polyethylene, ethylene/propylene elastic copolymer (EPR), and ethylene/propylene/diene copolymer (EPDM) has been generally used as a base resin of the insulating material. This is because such a general crosslinked resin maintains excellent flexibility and satisfactory electrical and mechanical strength even at high temperatures.

However, because crosslinked polyethylene (XLPE) or the like used as the base resin of the insulating material is in a crosslinked form, when the lifespan of a cable or the like including an insulation layer formed of a resin such as XLPE ends, the resin of the insulating layer cannot be recycled and should be disposed by incineration and thus is not environmentally friendly.

When polyvinyl chloride (PVC) is used as a material of a sheath layer, PVC is difficult to separate from the crosslinked polyethylene (XLPE) of the insulating material or the like and thus is not environmentally friendly because toxic chlorinated substances are generated during incineration.

Non-crosslinked high-density polyethylene (HDPE) or low-density polyethylene (LDPE) is environmentally friendly because when the lifespan of a cable including an insulating layer formed thereof ends, a resin of the insulating layer is recyclable but is inferior to XLPE in terms heat resistance and thus is limited to certain purposes due to low operating temperatures thereof.

It may be considered to use, as a base resin, polypropylene resin which has a melting point of 160° C. or higher and thus is environmentally friendly because it is excellent in heat resistance without being crosslinked. However, the polypropylene resin has insufficient flexibility, bendability and the like due to high rigidity thereof and thus has low workability during laying of a cable including an insulating layer formed thereof and is limited to certain purposes.

Therefore, there is an urgent need for a power cable which is environmentally friendly, is inexpensive to manufacture, and satisfies not only heat resistance and mechanical strength but also flexibility, bendability, impact resistance, cold resistance, installability, workability, etc. which are in trade-off with heat resistance and mechanical strength.

BRIEF SUMMARY OF THE INVENTION

The present invention is directed to providing an eco-friendly power cable.

The present invention is also directed to providing a power cable including an insulating layer which satisfies not only heat resistance and mechanical strength but also flexibility, bendability, impact resistance, cold resistance, installability, workability, etc. which are in trade-off with heat resistance and mechanical strength.

The present invention is also directed to providing a power cable of which the lifespan, flexibility, and installability can be additionally improved through precise control of a thickness of an insulating layer according to characteristics of an insulating material, thereby enhancing workability.

According to an aspect of the present invention, provided is a power cable comprising a conductor and an insulating layer covering the conductor, wherein the insulating layer is formed of an insulating composition containing heterophasic polypropylene resin, a flexural modulus of an insulating sample formed of the insulating composition at room temperature is in a range of 50 to 1,200 MPa, when measured according to the standard ASTM D790, and xylene insolubility thereof is 10% or less according to the following Equation 1:

$$\text{xylene insolubility} = (\text{mass of insulating sample after eluted with xylene solvent/mass of insulating sample before eluted with xylene solvent}) \times 100,$$

wherein the mass of insulating sample after eluted with xylene solvent represents mass of an insulating sample, measured when 0.3 grams of the insulating sample was immersed into a xylene solvent, heated at 150° C. or higher for six hours, cooled to room temperature, taken out of the xylene solvent and dried in an oven at 150° C. until the xylene solvent was dried, and a thickness of the insulating layer of the power cable is 5.5 to 84.0 times $t_{min}$ expressed in the following Equation 2:

$$t_{min} = 2.5 Uo / \text{breakdown electric field for insulating sample},$$

wherein Uo represents a reference voltage in a voltage test according to the standard IEC 60840, and the breakdown electric field for insulating sample represents an electric field (kV/mm) according to a voltage applied when a probability of dielectric breakdown occurring in a plurality of insulating samples was 63.2% when electrodes were brought into contact with both ends of each of the plurality of insulating samples to apply a voltage thereto.

According to another aspect of the present invention, provided is the power cable, wherein the heterophasic polypropylene resin comprises rubbery propylene copolymer dispersed in a crystalline polypropylene matrix.

According to other aspect of the present invention, provided is the power cable, wherein the crystalline polypropylene matrix comprises a propylene homopolymer, a propylene copolymer, or both of them.

According to other aspect of the present invention, provided is the power cable, wherein the rubbery propylene copolymer comprises at least one comonomer selected from the group consisting of ethylene and $C_{4-12}$ alpha-olefins such as 1-butene, 1-pentene, 4-methyl-1-pentene, 1-hexene, 1-heptene, 1-octene, and the like.

A power cable according to the present invention employing a non-crosslinked propylene polymer as a material of an insulating layer is environmentally friendly, has excellent heat resistance and mechanical strength, and at the same time satisfies flexibility, bendability, impact resistance, cold resistance, installability, workability, etc. which are in trade-off with heat resistance and mechanical strength.

In addition, the power cable according to the present invention exhibits an excellent effect of additionally improving the lifespan, flexibility, and installability thereof through precise control of a thickness of an insulating layer, thereby enhancing workability.

DETAILED DESCRIPTION OF THE INVENTION

Hereinafter, exemplary embodiments of the present invention will be described in detail. The present invention is, however, not limited thereto and may be embodied in many different forms. Rather, the embodiments set forth herein are provided so that this disclosure may be thorough and complete and fully convey the scope of the invention to those skilled in the art. Throughout the specification, the same reference numbers represent the same elements.

Figure 1:
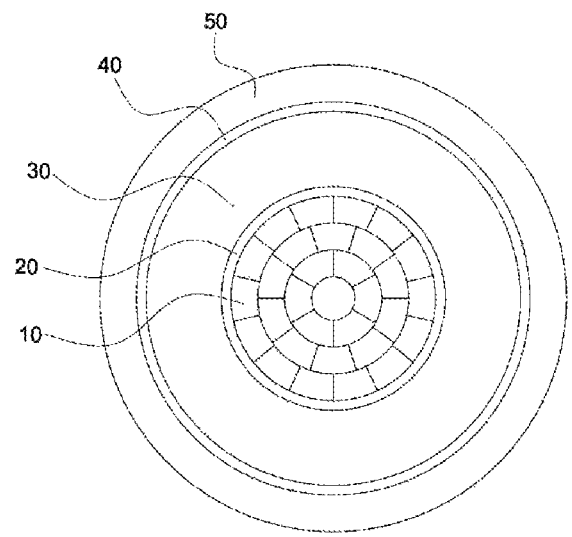
FIG. 1 is a schematic cross-sectional view of a power cable according to an embodiment of the present invention.
Figure 2:
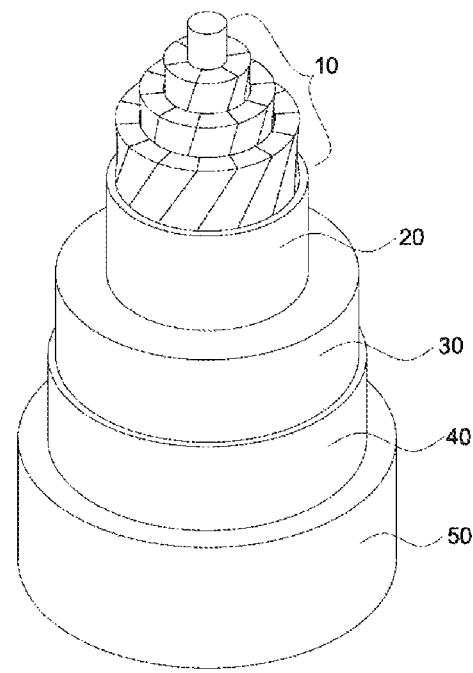
FIG. 2 is a schematic view of a longitudinal section of the power cable of FIG. 1.

FIGS. 1 and 2 illustrate a cross section and a longitudinal section of a power cable according to an embodiment of the present invention, respectively.

As illustrated in FIGS. 1 and 2, the power cable according to the present invention may include a conductor 10 formed of a conductive material such as copper or aluminum, an insulating layer 30 covering the conductor 10 and formed of an insulating polymer or the like, an inner semiconducting layer 20 configured to remove an air layer between the conductor 10 and the insulating layer 30 and reduce local electric-field concentration, an outer semiconducting layer 40 configured to shield the power cable and cause a uniform electric field to be applied to the insulating layer 30, a sheath layer 50 configured to protect for the power cable, and the like.

Specifications of the conductor 10, the insulating layer 30, the semiconducting layers 20 and 40, the sheath layer 50, and the like may vary according to a purpose of the power cable, a transmission voltage or the like. Materials of the conductor 10, the insulating layer 30, the semiconducting layers 20 and 40, and the sheath layer 50 may be the same or different.

The conductor 10 may be formed by twisting a plurality of stranded wires to improve flexibility, bendability, installability, workability, etc. of the power cable, and particularly include a plurality of conductor layers formed by arranging a plurality of stranded wires in a circumferential direction of the conductor 10.

The insulating layer 30 of the power cable according to the invention may be formed of a polypropylene copolymer, e.g., a heterophasic polypropylene containing two or more phases (specifically a crystalline resin and a rubbery resin), and particularly, an insulating composition which includes a non-crosslinked thermoplastic resin containing heterophasic polypropylene resin in which a rubbery propylene copolymer is dispersed in a crystalline polypropylene matrix.

Here, the crystalline polypropylene matrix may include a propylene homopolymer and/or a propylene copolymer, preferably a propylene homopolymer, and more preferably only a propylene homopolymer. The propylene homopolymer refers to polypropylene formed by polymerization of propylene contained in an amount of 99 wt % or more and preferably an amount of 99.5 wt % or more, based on the total weight of monomers.

The crystalline polypropylene matrix may be polymerized in the presence of a general stereospecific Ziegler-Natta catalyst, a metallocene catalyst, a constrained geometric catalyst, other organometallic or coordination catalysts, and preferably a Ziegler-Natta catalyst or the metallocene catalyst. Here, the term "metallocene" is a generic term for bis(cyclopentadienyl) metal which is a new organometallic compound in which cyclopentadiene and a transition metal are combined in a sandwich structure, and the simplest general formula is $M(C_5H_5)_2$ (here, M is Ti, V, Cr, Fe, Co, Ni, Ru, Zr, Hf or the like). Because the polypropylene polymerized in the presence of the metallocene catalyst has a low catalyst residual amount of about 200 to 700 ppm, it is possible to suppress or minimize a decrease in electrical properties of the insulating composition containing the polypropylene due to the catalyst residual amount.

The rubbery propylene copolymer dispersed in the crystalline polypropylene matrix is substantially amorphous. The rubbery propylene copolymer may include at least one comonomer selected from the group consisting of ethylene and $C_{4-12}$ alpha-olefins such as 1-butene, 1-pentene, 4-methyl-1-pentene, 1-hexene, 1-heptene, 1-octene and the like.

The rubbery propylene copolymer may be monomeric propylene-ethylene rubber (PER) or propylene-ethylene diene rubber (EPDM).

According to the present invention, the rubbery propylene copolymer may have a micro or nano particle size. The particle size of the rubbery propylene copolymer ensures uniform dispersion of the rubbery propylene copolymer in the crystalline polypropylene matrix and improvement of impact strength of the insulating layer including the rubbery propylene copolymer. In addition, a risk of cracks initiated by particles thereof may reduce and a possibility that propagation of already formed cracks will stop may increase due to the particle size of the rubbery propylene copolymer.

Because the heterophasic polypropylene resin has a high melting point in spite of the non-crosslinked form thereof, the heterophasic polypropylene resin exhibits sufficient heat resistance to provide a power cable with an improved continuous workable temperature range and is recyclable and thus environmentally friendly. In contrast, a general crosslinked resin is not recyclable and thus not environmentally friendly, and does not guarantee uniform productivity when crosslinking or scorch occurs early during formation of the insulating layer 30, thereby reducing long-term extrudability.

In the present invention, the insulating composition used to form the insulating layer 30 may further include a nucleating agent. The nucleating agent may be a sorbitol-based nucleating agent. That is, the nucleating agent is a sorbitol-based nucleating agent, for example, 1,3:2,4-bis(3, 4-dimethyldibenzylidene) sorbitol, bis(p-methyldibenzylidene) sorbitol, substituted dibenzylidene sorbitol, or a mixture thereof.

Due to the nucleating agent, curing of the non-crosslinked thermoplastic resin may be promoted even when not quenched in an extrusion process of the power cable, thus improving productivity of the power cable, a size of crystals generated during the curing of the non-crosslinked thermoplastic resin may be reduced to preferably 1 to 10 µm, thereby improving electrical properties of an insulating layer to be formed, and a plurality of crystallization sites where the crystals are formed may be formed to increase crystallinity, thereby simultaneously improving heat resistance and mechanical strength of the insulating layer.

Because a melting point of the nucleating agent is high, the nucleating agent should be injected and extruded at a high temperature of about 230° C. and it is preferable to use a combination of two or more sorbitol-based nucleating agents. When a combination of two or more different sorbitol-based nucleating agents are used, the expression of nucleating agents may be increased even at low temperatures.

The nucleating agent may be contained in an amount of 0.1 to 0.5 parts by weight, based on 100 parts by weight of the non-crosslinked thermoplastic resin. When the amount of the nucleating agent is less than 0.1 parts by weight, the heat resistance and electrical and mechanical strength of the non-crosslinked thermoplastic resin and the insulating layer including the same may reduce due to a large crystal size, e.g., a crystal size exceeding 10 µm and a non-uniform crystal distribution. When the amount of the nucleating agent is greater than 0.5 parts by weight, a surface interface area between the crystals and an amorphous portion of the resin increases due to an extremely small crystal size, e.g., a crystal size of less than 1 µm, and thus, alternating-current (AC) dielectric breakdown (ACBD) characteristics, impulse characteristics, etc. of the non-crosslinked thermoplastic resin may decrease.

In the present invention, the insulating composition used to form the insulating layer 30 may further include insulating oil.

Mineral oil, synthetic oil, or the like may be used as the insulating oil. In particular, an aromatic oil composed of an aromatic hydrocarbon compound such as dibenzyl toluene, alkylbenzene, or alkyldiphenylethane, a paraffinic oil composed of a paraffinic hydrocarbon compound, a naphthenic oil composed of a naphthenic hydrocarbon compound, silicone oil, or the like may be used as the insulating oil.

The insulating oil may be contained in an amount of 1 to 10 parts by weight and preferably 1 to 7.5 parts by weight, based on 100 parts by weight of the non-crosslinked thermoplastic resin. When the amount of the insulating oil is greater than 10 parts by weight, elution of the insulating oil may occur during extrusion of the insulating layer 30 on the conductor 10, thus making it difficult to process the power cable.

As described above, due to the insulating oil, flexibility, bendability, etc. of the insulating layer 30 in which polypropylene rein having relatively low flexibility due to high rigidity is employed as a base resin may be additionally improved, thereby facilitating laying of the power cable, and high heat resistance and mechanical and electrical properties of the polypropylene resin may be maintained or improved. Particularly, a reduction of processability of the polypropylene resin due to a slightly narrow molecular weight distribution when polymerized in the presence of a metallocene catalyst may be supplemented due to the insulating oil.

In the present invention, a flexural modulus of an insulating sample formed of the insulating composition for forming the insulating layer 30 may be 50 to 1,200 MPa and preferably 200 to 1,000 MPa at room temperature (when measured according to the standard ASTM D790), and xylene insolubility may be 10% or less.

Here, the flexural modulus may be measured according to the standard ASTM D790 by placing cuboid insulating samples on two supports and measuring a load applied when surface rupture occurs in the insulating samples or when a deformation rate of the insulating samples is 5.0% while a load is applied to a midpoint between the insulating samples on the two supports. Heat resistance, mechanical properties, etc. of the insulating layer 30 may be insufficient when the flexural modulus of the insulating samples at room temperature is less than 50 MPa, whereas flexibility, cold resistance, installability, workability, etc. of the insulating layer 30 may significantly reduce when the flexural modulus of the insulating samples at room temperature is greater than 1,200 MPa.

The xylene insolubility may be calculated by Equation 1 below.

$$\text{xylene insolubility} = (\text{mass of insulating sample after eluted with xylene solvent}/\text{mass of insulating sample before eluted with xylene solvent}) \times 100 \quad \text{[Equation 1]}$$

In Equation 1 above, "mass of insulating sample after eluted with xylene solvent" represents the mass of an insulating sample, measured after 0.3 grams of the insulating sample was immersed in a xylene solvent, heated at 150° C. or higher for six hours, cooled to room temperature, taken out of the xylene solvent and dried in an oven at 150° C. until the xylene solvent was dried.

That is, the mass of the insulating samples after elution in a xylene solvent corresponds to the total mass of a crystalline polypropylene matrix and other additives remaining after removal of the rubbery polypropylene copolymer eluted with the xylene solvent from the insulating samples. Accordingly, when the xylene insolubility is greater than 10%, i.e., when the amount of crystalline portions in the insulating samples is excessive, the flexibility, cold resistance, installability, workability, etc. of the insulating layer 30 may significantly reduce.

In the present invention, the insulating layer 30 may be precisely designed to have a thickness of $a \times t_{min}$ assuming that the flexural modulus and the xylene insolubility of the insulating composition for forming the insulating layer 30 satisfy the ranges described above. Here, a is in a range of 5.5 to 84.0, and $t_{min}$ may be defined by Equation 2 below.

$$t_{min} = 2.5 Uo / \text{breakdown electric field for insulating sample} \quad \text{[Equation 2]}$$

In Equation 2 above, Uo represents a reference voltage for a voltage test according to the standard IEC 60840, as shown in Table 1 below, and the breakdown electric field for insulating sample represents an electric field (kV/mm) according to a voltage applied when a probability of dielectric breakdown occurring in a plurality of insulating samples, e.g., twenty insulating samples, which are collected from an insulating layer of a cable is 63.2% when electrodes are brought into contact with both ends of each of the plurality of insulating samples to apply a voltage thereto.

TABLE 1

| 1 Rated voltage U kV | 2 Highest voltage for equipment $U_m$ kV | 3 Value of $U_0$ determination of test voltages $U_0$ kV | $4^a$ Voltage test of 9.3 2.5 $U_0$ kV | $5^a$ Partial discharge test of 9.2 and 12.4.4 1.5 $U_0$ kV | $6^a$ Tan δ measurement of 12.4.5 $U_0$ kV | $7^a$ Heating cycle voltage test of 12.4.6 2 $U_0$ kV | $8^a$ Lightning impulse voltage test of 10.12, 12.4.7 and 13.2.5 kV | $9^a$ Voltage test of 12.4.7 2.5 $U_0$ | $10^b$ Voltage test after installation of 16.3 kV |
|---|---|---|---|---|---|---|---|---|---|
| 45 to 47 | 52 | 26 | 65 | 39 | 26 | 52 | 250 | 65 | 52 |
| 60 to 69 | 72.5 | 36 | 90 | 54 | 36 | 72 | 325 | 90 | 72 |
| 110 to 115 | 123 | 64 | 160 | 96 | 64 | 128 | 550 | 160 | 128 |
| 132 to 138 | 145 | 76 | 190 | 114 | 76 | 152 | 650 | 190 | 132 |
| 150 to 151 | 170 | 87 | 218 | 131 | 87 | 174 | 750 | 218 | 150 |

[a] necessary, these test voltages shall be adjusted as stated in 12.4.1.
[b] necessary, these test voltages shall be adjusted as stated in 18.3.

In the present invention, when the thickness of the insulating layer 30 of the power cable is greater than $a \times t_{min}$ described above, the thickness of the cable insulating layer is excessive and thus the installability and workability of the power cable may unnecessarily reduce. When the thickness of the insulating layer 30 is less than $a \times t_{min}$, the lifespan of the power cable may reduce due to dielectric breakdown due to insufficient dielectric strength of the insulation layer 30 of the power cable.

The invention claimed is:

1. A power cable comprising a conductor and an insulating layer covering the conductor, wherein the insulating layer is formed of an insulating composition containing heterophasic polypropylene resin,
a flexural modulus of an insulating sample formed of the insulating composition at room temperature is in a range of 50 to 1,200 MPa, when measured according to the standard ASTM D790, and xylene insolubility thereof is 10% or less according to the following Equation 1:

xylene insolubility=(mass of insulating sample after eluted with xylene solvent/mass of insulating sample before eluted with xylene solvent)×100, wherein the mass of insulating sample after eluted with xylene solvent represents mass of an insulating sample, measured when 0.3 grams of the insulating sample was immersed into a xylene solvent, heated at 150° C. or higher for six hours, cooled to room temperature, taken out of the xylene solvent and dried in an oven at 150° C. until the xylene solvent was dried, and
a thickness of the insulating layer of the power cable is 5.5 to 84.0 times $t_{min}$ expressed in the following Equation 2:

$t_{min}$=2.5$U_o$/breakdown electric field for insulating sample, wherein Uo represents a reference voltage in a voltage test according to the standard IEC 60840, and
the breakdown electric field for insulating sample represents an electric field (kV/mm) according to a voltage applied when a probability of dielectric breakdown occurring in a plurality of insulating samples was 63.2% when electrodes were brought into contact with both ends of each of the plurality of insulating samples to apply a voltage thereto.

2. The power cable of claim 1, wherein the heterophasic polypropylene resin comprises rubbery propylene copolymer dispersed in a crystalline polypropylene matrix.

3. The power cable of claim 2, wherein the crystalline polypropylene matrix comprises a propylene homopolymer, a propylene copolymer, or both of them.

4. The power cable of claim 2, wherein the rubbery propylene copolymer comprises at least one comonomer selected from the group consisting of ethylene and $C_{4-12}$ alpha-olefins such as 1-butene, 1-pentene, 4-methyl-1-pentene, 1-hexene, 1-heptene, 1-octene, and the like.

5. An insulating composition comprising heterophasic polypropylene resin,
wherein a flexural modulus of an insulating sample formed of the insulating composition at room temperature is in a range of 50 to 1,200 MPa, when measured according to the standard ASTM D790, and xylene insolubility thereof is 10% or less according to the following Equation 1:

xylene insolubility=(mass of insulating sample after eluted with xylene solvent/mass of insulating sample before eluted with xylene solvent)×100, wherein the mass of insulating sample after eluted with xylene solvent represents mass of an insulating sample, measured when 0.3 grams of the insulating sample was immersed into a xylene solvent, heated at 150° C. or higher for six hours, cooled to room temperature, taken out of the xylene solvent and dried in an oven at 150° C. until the xylene solvent was dried, and
a thickness of the insulating layer of the power cable is 5.5 to 84.0 times tmin expressed in the following Equation 2:

$t$ min=2.5$U_o$/breakdown electric field for insulating sample, wherein Uo represents a reference voltage in a voltage test according to the standard IEC 60840, and
the breakdown electric field for insulating sample represents an electric field (kV/mm) according to a voltage applied when a probability of dielectric breakdown occurring in a plurality of insulating samples was 63.2% when electrodes were brought into contact with both ends of each of the plurality of insulating samples to apply a voltage thereto.

6. The insulating composition of claim 5, wherein the heterophasic polypropylene resin comprises rubbery propylene copolymer dispersed in a crystalline polypropylene matrix.

7. The insulating composition of claim 6, wherein the crystalline polypropylene matrix comprises a propylene homopolymer, a propylene copolymer, or both of them.

8. The insulating composition of claim 6, wherein the rubbery propylene copolymer comprises at least one comonomer selected from the group consisting of ethylene and C4-12 alpha-olefins such as 1-butene, 1-pentene, 4-methyl-1-pentene, 1-hexene, 1-heptene, 1-octene, and the like.

\* \* \* \* \*